United States Patent [19]

Dasek et al.

[11] 4,216,235
[45] Aug. 5, 1980

[54] ELIMINATION OF FLATULENT SUGARS FROM SOY

[75] Inventors: Jaroslav Dasek, Yverdon; David Shepherd, Morges; Robert D. Wood, Le Mont-sur-Lausanne, all of Switzerland

[73] Assignee: Societe d'Assistance Technique pour Produits Nestle S.A., Lausanne, Switzerland

[21] Appl. No.: 967,489

[22] Filed: Dec. 7, 1978

[30] Foreign Application Priority Data

Jan. 4, 1978 [CH] Switzerland .............................. 69/78

[51] Int. Cl.$^2$ ............................................... A23L 1/20
[52] U.S. Cl. ........................................ 426/46; 426/52; 426/44
[58] Field of Search ....................... 426/44, 46, 52, 49; 195/7, 11, 13, 111, 76, 79

[56] References Cited

U.S. PATENT DOCUMENTS

| 3,632,346 | 1/1972 | Sherba .................................... 426/46 |
| 3,803,329 | 4/1974 | Valentas et al. .................... 426/44 X |
| 3,810,997 | 5/1974 | Chien ..................................... 426/49 |
| 3,958,015 | 5/1976 | Gay ..................................... 426/46 X |
| 4,008,334 | 2/1977 | Hansen .................................... 426/46 |

Primary Examiner—R. B. Penland
Attorney, Agent, or Firm—Watson, Leavenworth, Kelton & Taggart

[57] ABSTRACT

A process for eliminating the flatulent sugars present in soya which comprises preparing an aqueous soya suspension containing from 5 to 45% by weight of dry matter, inoculating the suspension thus prepared with at least one strain of Saccharomyces uvarum which has reached the state of growth on a medium containing at least one sugar having at least one α-D-galactopyranosyl bond and fermenting the suspension under anaerobic conditions for at least 8 hours at a temperature of from 15° to 50° C.

8 Claims, No Drawings

ELIMINATION OF FLATULENT SUGARS FROM SOY

This invention relates to a process for eliminating flatulent sugars from soya, in which an aqueous soya suspension is fermented by edible yeasts, particularly *Saccharomyces (S.) uvarum*.

Soya beans or soya cake lend themselves to the production of edible starting materials, such as soya meals or soya flours. The use of these starting materials in the production of foods intended for human consumption involves problems of taste and digestibility. In the Far East, the native populations are more or less accustomed to the typical taste which it is so difficult to eliminate or neutralise in soya-based products. They have often resolved the problem of digestibility by using indigenous microorganisms for degrading the substances responsible. For example, they prepare their traditional food known as tempeh by fermenting crushed soya beans with the mould known as *Rhizopus oligosporus*. Even to the Western palate, this food has an entirely acceptable taste. However, these ancestral solutions cannot be universally adopted. The number of microorganisms permitted under the laws and regulations of certain Western countries for example is very restricted. If it is desired to solve the problem posed by the typical taste and the indigestible oligosaccharides of soya by the use of microorganisms on an industrial scale, it is possible to use only the permitted microorganisms in these countries, in other words to the so-called edible microorganisms, particularly edible yeasts. Now, only the yeasts *S. cerevisiae*, *S. carlsbergensis*, which has recently been renamed *S. uvarum*, *Candida utilis* and *Kluyveromyces fragilis* are generally accepted as edible yeasts. Among these yeasts, it is further necessary to select those which synthesise the enzymes necessary for degrading the oligosaccharides present in soya which are responsible for flatulence phenomena, namely raffinose and stachyose.

Thus, in one known process developed in the production of vegetable proteins textured by treatment with steam under pressure, a soya flour moistened to such an extent that its moisture content amounts to between about 15 and 35% is fermented with *S. carlsbergensis* or *S. cerevisiae* for example. The moist, fermented granulated mass is then treated with steam under pressure. The product obtained has a texture reminiscent of that of meat and a taste which cannot be conferred by either of the two treatments applied on its own. In another known process, an aqueous suspension of soya flour preferably containing approximately 10% of dry matter is fermented under aerobic conditions with *S. cerevisiae* or *S. carlsbergensis* for example. The material thus treated is intended to contain from 55% to 65% of proteins, of which a few percent are attributable to the yeasts themselves. It lends itself to the production of a vegetable milk and may be introduced into the composition of certain cheeses without significantly altering their properties.

The two known processes referred to above, namely the static fermentation of a moistened soya flour and the aerobic fermentation of an aqueous suspension, are attended by certain disadvantages of an economic or qualitative nature. The first process only enables the total soluble sugar content to be reduced by about half for a very long fermentation time of the order of 48 to 96 hours. Homogeneity of the treatment in the moist granular mass hardly seems possible. The second process does not enable suspensions of high dry matter content to be used. The dry matter content must not exceed a value of the order of 10% to 15% if the foam produced by the proteins beaten in the vigorously stirred suspensions is not to become excessive. In addition, in this second process, the quantity of yeast produced in the fermentation broth reaches approximately half the quantity of degraded sugar. In other words, a characteristic soya taste is exchanged for a characteristic yeast taste.

Subsequently, it was proposed in U.S. Pat. No. 4,008,334 to remove the water soluble carbohydrates present in soya by aerobic fermentation in aqueous suspension with baker's yeast, i.e. with *S. cerevisiae* and certain strains of *S. carlsbergensis* (brewer's yeast) and *S. cerevisiae* var. *ellipsoideus* (wine yeast). In this patent specification, it is pointed out that, contrary to what had been previously observed in connection with this species, *S. cerevisiae* has the enzymatic equipment required for degrading raffinose and stachyose and that it is even the best yeast known to the author for this purpose. In the Examples of this patent, the accent is also placed on the use of baker's yeast. However, it has been found that, as can be seen from the book entitled "The Yeasts" (2nd Edition, 1970) by J. Lodder, who is an authority on the subject, *S. cerevisiae* does not have the enzymatic equipment required for degrading the flatulent sugars present in soya.

It would seem that this fact is also confirmed in another recent document, according to which it is important to use low-fermentation brewer's yeasts as opposed to high-fermentation brewer's yeasts which are identified as being respectively formed by *S. carlsbergensis* and *S. cerevisiae*. According to this document, however, the living yeast is added to a broth of soya flour mixed with its equivalent by weight of water and the mixture is only left to react for a few hours. The degradation of the flatulent sugars under these conditions seems extremely hypothetical and the tasting example given in this patent seems to confirm this impression.

In another known process for the production of a modified vegetable protein, which may serve as a substitute for caseinate, a soya flour is suspended in water, the resulting suspension is inoculated with *S. cerevisiae* and *S. carlsbergensis* and left to ferment for 60 hours at 16° C. in a closed vessel, after which sodium hydroxide is added to obtain a carbonate by reaction with the carbon dioxide produced during fermentation, the product is heated to react the carbonate with the protein and neutralised with an acid. In this process, it is probable that the soluble sugars present in the soya are not all degraded, particularly the flatulent oligosaccharides.

Finally, the anaerobic fermentation of an aqueous soya suspension with yeasts has already been described in relatively old documents. However, in their case, too, the authors in question assumed all the sugars present in the soya to be converted into degradation products, namely alcohol and carbon dioxide, although it is doubtful whether the degradation level quoted for the flatulent oligosaccharides was in fact achieved.

The present invention is the result of efforts to find a process which enables the sugars present in soya to be completely degraded.

The present invention provides a process for eliminating the flatulent sugars present in soya which comprises preparing an aqueous soya suspension containing from 5 to 45% by weight of dry matter, inoculating the suspension thus prepared with at least one strain of *S. uvarum* which has reached the state of growth (growth phase) on a medium containing at least one sugar having at least one α-D-galactopyranosyl bond and fermenting the suspension under anaerobic conditions for at least 8 hours at a temperature of from 15° C. to 50° C.

It has been found that the flatulent sugars cannot be completely eliminated simply by fermentation with yeasts, even with yeasts which are known to have the necessary enzymatic equipment. It has proved to be absolutely essential to induce the production of α-galactosidase by the microorganism for it to be subsequently capable of effectively breaking the α-D-galactopyranosyl bonds of all the raffinose and stachyose present in the soya suspension. Systematic comparative tests have shown that *S. cerevisiae* does not produce α-galactosidase, even if an attempt is made to grow it on a medium containing raffinose for example, and that certain strains of *S. uvarum* are capable of producing α-galactosidase providing they are grown on a medium containing a sugar which requires this enzyme for degradation. It has also been found that both *S. cerevisiae* and *S. uvarum* are capable of producing invertase, but not in the same quantities. It has also been found, that it is possible considerably to reduce the time required for completely eliminating the flatulent sugars by inoculating the soya suspension with a mixture of two strains, one having a high invertase activity, such as certain strains of *S. cerevisiae* or of *S. uvarum* cultivated on glucose or saccharose which rapidly break the stachyose and raffinose into fructose plus manninotriose and melibiose, and the other having a high α-galactosidase activity, such as certain strains of *S. uvarum* cultivated on stachyose or raffinose which eliminate the manninotriose and the melibiose.

The process according to the invention is economic. It eliminates the need both for the supply of sterilised air and for the energy required for vigorous stirring. Slow or intermittent stirring is sufficient. The process according to the invention is also effective. The total content of soluble sugars may be reduced to almost zero in a reasonable time. Only a modest quantity of yeast is produced in the broth because most of the sugar is converted into volatile alcohol and $CO_2$.

Dehulled and ground soya beans or an optionally defatted soya flour for example may be used as starting material for carrying out the process according to the invention. In the context of the invention, a soya suspension is understood to be a suspension of any material in divided form obtained from the soya bean and comprising a large proportion of its edible constituents, with the possible exclusion of its oil which may have been either pressed out or extracted. It is preferred to prepare a suspension of defatted soya flour or a suspension of whole soya containing from 10 to 45% by weight of dry matter.

For fermentation, it is possible to use any strain of *S. uvarum* which is capable of degrading the flatulent sugars present in soya after having been cultivated on raffinose or stachyose for example. It is also possible to use a combination of one such strain with any other strain of edible yeast having a high invertase activity. In the context of the invention, edible yeast is understood to be a yeast which is non-toxic to human beings.

This is the case in particular with brewer's and baker's yeasts. Outstanding results may be obtained by using the strain *S. uvarum* CBS 1502 which has reached the state of growth on a medium of which the principal carbon source is a flatulent sugar, particularly raffinose, preferably in combination with one of the strains *S. cerevisiae* CBS 5494 and *S. uvarum* CBS 2451 which have reached the state of growth on a medium of which the principal carbon source is glucose or saccharose for example.

Before inoculating it with the selected yeast, it is advisable to pasteurise the suspension by a heat treatment for example. If a suspension of defatted soya flour is prepared, it may be pasteurised by heating for about 15 minutes to a temperature of the order of 60° to 70° C. or by rapid heating, for example for 30 to 60 seconds, to a temperature of from 130° to 145° C. If a suspension of whole soya is prepared, it is possible to grind the beans in the presence of water at an elevated temperature to obtain a dispersion of particles having a diameter of the order of 0.5 mm, to heat the dispersion for 5 to 45 seconds to a temperature of from 120° to 160° C. by the injection of steam in order to reduce the antitrypsin factor and then to grind the dispersion in a suitable apparatus, particularly a ball mill to obtain a soft, unctuous and stable suspension of particles having diameters of the order of a few microns to a few tens of microns for example.

The suspension may then be inoculated by adding to it a quantity of living yeast corresponding, in ‰ by weight of dry matter, to approximately 0.5 to 10 ‰ of the quantity of soya in suspension. The inoculum used may be at least one strain of *S. uvarum* which has been brought to the state of growth on a medium of which the principal carbon source is formed by at least one of the oligosaccharides present in soya, particularly raffinose. This inoculum may be prepared in two steps, for example by initially cultivating the selected strain for about 20 hours on a medium containing glucose or saccharose as principal carbon source and subsequently transferring it to a medium containing at least one of the oligosaccharides present in soya as principal carbon source for cultivating it on that medium for about another 20 hours. The inoculum used may be fresh, frozen or dried by freeze drying. As mentioned above, this inoculum may also contain another strain of edible yeast which has a high invertase activity.

After the suspension has been inoculated, it is left to ferment under anaerobic conditions. These conditions may be maintained simply by stirring the culture medium only very slowly or periodically so that hardly any air reaches the yeasts in the suspension. The sole object of this slow or periodic stirring is to maintain the homogeneity of the suspension being treated.

The desired result is obtained by fermenting the suspension for at least 8 hours and preferably for 10 to 24 hours at a temperature of from 15° to 50° C. Fermentation may then be stopped. To this end, it is possible for example to heat the suspension for 10 to 30 minutes to a temperature of the order of 70° to 85° C., i.e. to pasteurise it, and then to treat it in all kinds of ways, depending on the purpose for which the fermented material is to be used, or even to dry it on rollers or by spray drying or by freeze drying, optionally after concentration by evaporation in vacuo or by means of an evaporator of the scraped-surface type for example. The ethanol produced during fermentation evaporates during drying. The quantity of yeast produced during fermentation which remains in the end product is so small that it almost falls within the margin of error inherent in the methods normally used for determining the dry matter content of an aqueous suspension. The product thus obtained has a perfectly neutral taste and odour. It may be used as a protein supplement, complement or substitute in the food industry and particularly in the dietetic food industry. It is particularly suitable for the production of vegetable milks or meat substitutes.

The invention is illustrated by the following Examples in which the percentages quoted represent percent by weight. Unless otherwise indicated, the total sugar contents (monosaccharides and polysaccharides) are determined by a colorimetric method developed by V. Trevelyan in which a complex formed by the sugars is determined with anthrone in concentrated sulphuric acid.

EXAMPLE 1

S. uvarum CBS 1502 is cultivated in a nutrient medium having the following composition:

| | |
|---|---|
| saccharose | 20 g |
| $(NH_4)_2HPO_4$ | 10 g |
| $K_2HPO_4$ | 5 g |
| $Na_2SO_4$ | 0.5 g |
| yeast extract | 0.25 g |
| corn steep liquor | 0.25 g |
| tap water | 1000 ml | and 10 ml of a solution having the following composition:

| | |
|---|---|
| $MgSo_4 . 7H_2O$ | 20 g |
| $FeSO_4 . 7H_2O$ | 1 g |
| $MnSO_4$ | 1 g |
| NaCl | 1 g |
| distilled water | 500 ml |

After 24 hours, the strain is transferred to a medium identical with the preceding medium except for the fact that the 20 g of saccharose are replaced by 5 g of raffinose. After cultivation for 20 hours at 30° C. in stirred bottles, an inoculum is obtained which contains 2.5 g of yeast by weight of dry matter per liter and of which the pH-value is 3.75.

20 Liters of a 20% aqueous suspension of defatted soya flour marketed under the name "Soya Fluff W 200" by the central Soya Company of the United States are prepared in a 30 liter fermenter. The suspension is pasteurised for 15 minutes at 60° C. It is then inoculated with 0.6 part by weight of dry matter of yeast per 1000 parts of soya flour in suspension. The pH is left to develop freely. It has a value of 6.6 before pasteurisation and a value of 6.2 after pasteurisation, subsequently falling progressively to 5.8 during fermentation. The suspension is slowly stirred by means of two perforated-blade stirrers rotating at a speed of from 50 to 75 rpm. The fermentation temperature is kept at 30° C. A content of total soluble sugars of 18.5 mg/ml is measured at the beginning of fermentation. This value falls first rapidly and then more slowly to 1.5 mg/ml over a fermentation time of 24 hours. This reduction of more than 90% of the total soluble sugars is completely confirmed by parallel routine examinations using thin layer chromatography.

EXAMPLE 2

A suspension of whole soya is inoculated with an inoculum prepared in the same way as described in Example 1 and left to ferment under comparable conditions. The results obtained are also comparable with those described in Example 1.

EXAMPLES 3-14

A series of systematic tests was carried out to establish whether other strains of edible yeast have α-galactosidase activity, with and without induction on flatulent sugar, to establish also which edible yeasts could be particularly recommended for their high invertase activity and to form pairs of strains particularly effective for degrading the flatulent sugars present in soya by the combined activity of their respective enzymes α-galactosidase and invertase. The results of these tests are shown in the following Table:

| Ex. No. | Strains | Stachyose 12 h | Stachyose 24 h | Raffinose 12 h | Raffinose 24 h | Manninotriose 12 h | Manninotriose 24 h | Melibiase 12 h | Melibiase 24 h |
|---|---|---|---|---|---|---|---|---|---|
| 3 | Candida utilis CBS 841 (glucose) | + | + | + | + | − | + | − | + |
| 4 | Saccharomyces cerevisiae CBS 4054 | + | + | + | + | − | + | − | + |
| 5 | Saccharomyces cerevisiae CBS 5494 | + | − | + | − | − | + | − | + |
| 6 | Saccharomyces uvarum CBS 1502 (glucose) | + | + | + | + | − | − | − | + |
| 7 | Saccharomyces uvarum CBS 2451 | − | − | − | − | + | + | + | + |
| 8 | Candida utilis CBS 841 (raffinose) | + | + | + | + | − | + | − | + |
| 9 | Saccharomyces cerevisiae CBS 4054 (raffinose) | + | + | + | + | − | + | − | + |
| 10 | Saccharomyces cerevisiae CBS 5494 (raffinose) | + | − | + | − | − | + | − | + |
| 11 | Saccharomyces uvarum CBS 1502 (raffinose) | + | − | + | − | + | − | + | − |
| 12 | Saccharomyces uvarum CBS 2451 (raffinose) | − | − | − | − | + | + | + | + |
| 13 | S. cerevisiae CBS 5494 (glucose) + S. uvarum CBS 1502 (raffinose) | − | − | − | − | − | − | − | − |
| 14 | S. uvarum CBS 2451 (glucose) + S. uvarum CBS 1502 (raffinose) | − | − | − | − | − | − | − | − |

The measurements were made by thin layer chromatography after 12 hours and 24 hours' fermentation of an aqueous suspension of micronised whole soya having the following characteristics:

| | |
|---|---|
| dry matter | 10% |
| proteins | 5% |
| total soluble sugars | 2% |

|  |  |
|---|---|
| of which |  |
| stachyose = | 0.6% |
| raffinose = | 0.7%. |

Fermentation was carried out with the various microorganisms and pairs of microorganisms indicated in the left-hand column. The sugar in brackets indicates what was the carbon source of the medium on which the inoculum or the semi-inoculum was prepared. Except for the carbon source, the preparation medium had the composition of the preparation medium indicated in Example 1. Each strain was cultivated thereon for 20 hours at 30° C. in stirred bottles. The soya suspension was inoculated with 0.6 part by weight of yeast dry matter per thousand parts of soya flour in suspension.

It can be seen from the above Table that *Candida utilis* CBS 841, *S. cerevisiae* CBS 4054 and *S. uvarum* CBS 1502 cultivated on glucose have only a low invertase activity. *S. cerevisiae* CBS 5494 and *S. uvarum* CBS 2451 cultivated on glucose respectively have a high and a very high invertase activity. *Candida utilis* CBS 841 and *S. cerevisiae* CBS 4054 cultivated on raffinose still show no α-galactosidase activity. *S. cerevisiae* CBS 5494 and *S. uvarum* CBS 2451 cultivated on raffinose show respectively their high and very high invertase activities, but no α-galactosidase activity. *S. uvarum* CBS 1502 cultivated on raffinose shows both a high invertase activity and a high α-galactosidase activity.

The best results are obtained by combining *S. cerevisiae* CBS 5494 or *S. uvarum* CBS 2451 with *S. uvarum* CBS 1502 cultivated on raffinose, all the sugars present in soya being able to be degraded in less than 12 hours by means of a combination such as this.

EXAMPLE 15

The process described in Example 2 of U.S. Pat. No. 4,008,334 is carried out in two parallel fermenters in order to increase the experimental certainty. An aqueous suspension containing 15% of dry matter of defatted soya flour is prepared. The pH is adjusted to 4.5. The suspension is pasteurised for 15 minutes at 90° C. It is inoculated with living baker's yeast of the type supplied by the company Malteserkorsgaer de De Danske Sprit Fabrikker in a quantity of 0.25% by weight of dry matter of yeast based on the weight of soya dry matter. The suspension is left to ferment while stirring for 16.5 hours during which it is aerated with 0.5 volume of air per volume of suspension per minute.

Sterility checks were made at regular intervals and did not reveal any significant development of bacterial contamination. The number of yeast cells was counted at the beginning and at the end of fermentation and was found to be 9.4 times larger at the end than at the beginning. This shows that the degradation of the sugars solubilised in the suspension was indeed caused by the yeast cells and not by any other contaminating microorganism.

The level of degradation of the soluble sugars in the suspension was determined by thin layer chromatography after 0, 6, 9, 12 and 16.5 hours of fermentation. This analysis produced the same results for the two parallel fermentation tests. These results are shown in the following Table:

|  | 0 h | 6 h | 9 h | 12 h | 15 h | 16.5 h |
|---|---|---|---|---|---|---|
| starting spot | ++ | ++ | ++ | ++ | ++ | ++ |
| stachyose | ++++ | +++ | + | traces | − | − |
| manninotriose | traces | + | +++ | ++++ | ++++ | ++++ |
| raffinose | ++ | + | − | − | − | − |
| melibiose | + | ++ | +++ | ++++ | ++++ | ++++ |
| sucrose | ++ | − | − | − | − | − |
| galactose | − | − | − | − | − | − |
| glucose-fructose | ++++ | − | − | − | − | − |

It can be seen from this Table that the stachyose and raffinose disappear due to the invertase whilst the manninotriose and the melibiose accumulate due to the absence of α-galactosidase. The sucrose, galactose, glucose and fructose disappear in less than 6 hours. Accordingly, the yeast used does not have sufficient α-galactosidase activity although effective in other respects. It may be concluded from this that the flatulent fraction of the flatulent sugars present in soya is not degraded by the process in U.S. Pat. No. 4,008,334.

We claim:

1. A process for eliminating the flatulent sugars present in soya which comprises preparing an aqueous soya suspension containing from 5 to 45% by weight of dry matter, inoculating the suspension thus prepared with at least one strain of *Saccharomyces (S.) cerevisiae* or *S. uvarum* of which the inoculum was prepared on a medium wherein the principal carbon source is glucose or saccharose, in combination with at least one strain of *S. uvarum* of which the inoculum was prepared on a medium containing at least one sugar having at least one α-D-galactopyranosyl bond and fermenting the suspension under anaerobic conditions for at least 8 hours at a temperature of from 15° to 50° C.

2. A process as claimed in claim 1, wherein the suspension is fermented for 10 to 24 hours.

3. A process as claimed in claim 1, wherein the aqueous soya suspension which is prepared is a suspension of defatted soya flour.

4. A process as claimed in claim 1, wherein the aqueous soya suspension which is prepared is a suspension of whole soya.

5. A process as claimed in claim 1, wherein the strain of *S. uvarum* is *S. uvarum* CBS 1502.

6. A process as claimed in claim 1, wherein the suspension is fermented by one of the strains *S. cerevisiae* CBS 5494 and *S. uvarum* CBS 2451 of which the inoculum was prepared on a medium of which the principal carbon source is glucose or saccharose in combination with *S. uvarum* CBS 1502 of which the inoculum was prepared on a medium of which the principal carbon source is raffinose or stachyose.

7. A process as claimed in claim 1, wherein fermentation is stopped by pasteurisation or by drying on a roller or by spray drying.

8. A soya preparation having flatulent sugars eliminated therefrom when produced by a process as claimed in claim 1.

* * * * *

UNITED STATES PATENT AND TRADEMARK OFFICE
CERTIFICATE OF CORRECTION

PATENT NO. : 4,216,235

DATED : August 5, 1980

INVENTOR(S) : Jaroslav Dasek, David Shepherd and Robert D. Wood

It is certified that error appears in the above-identified patent and that said Letters Patent are hereby corrected as shown below:

In the Table appearing at column 6, the subheading "Melibiase" should read -- Melibiose --.

In the Table appearing at column 6, at line 25, in Example No. 4, under the subheading "Strains", immediately beneath the designation "CBS 4054", there should appear --(glucose)--.

In the Table appearing at column 6, at line 27, in Example No. 5, under the subheading "Strains", immediately beneath the designation "CBS 5494", there should appear --(glucose)--

In the Table appearing at column 6, at line 33, in Example No. 7, under the subheading "Strains", immediately beneath the designation "CBS 2451", there should appear --(glucose)--

Signed and Sealed this

Twenty-fifth Day of November 1980

[SEAL]

Attest:

*Attesting Officer*

SIDNEY A. DIAMOND

*Commissioner of Patents and Trademarks*